United States Patent [19]

Mistrorigo et al.

[11] Patent Number: 4,944,931

[45] Date of Patent: Jul. 31, 1990

[54] PROCESS FOR PRODUCING NITROSYL FLUORIDE

[75] Inventors: Mario Mistrorigo, Arzignano; Massimo Barcaro, Vicenza; Andrea Faccin, San Quirico, all of Italy

[73] Assignee: Miteni S.r.L., Cagliari, Italy

[21] Appl. No.: 308,760

[22] Filed: Feb. 9, 1989

[30] Foreign Application Priority Data

Feb. 12, 1988 [IT]  Italy ................................ 19388 A/88

[51] Int. Cl.$^5$ ............................................ C01B 21/084
[52] U.S. Cl. .................................... 423/386; 423/472
[58] Field of Search ................................ 423/386, 472

[56] References Cited

U.S. PATENT DOCUMENTS 3,338,887  8/1967  Ito et al. ............................... 423/386

OTHER PUBLICATIONS

Simons, J. H., ed., *Fluorine Chemistry*, Academic Press, NY, vol. 1, pp. 88–91.

*Primary Examiner*—Jeffrey E. Russel
*Assistant Examiner*—Brian M. Bolam
*Attorney, Agent, or Firm*—Hedman, Gibson, Costigan & Hoare

[57] ABSTRACT

Nitrosyl fluoride (NOF) is prepared in a simple and economical manner with high yield by reacting nitrosyl sulphuric acid ($ONOSO_3H$) with hydrofluoric acid, operating in the liquid phase in the presence of water.

9 Claims, No Drawings

PROCESS FOR PRODUCING NITROSYL FLUORIDE

This invention relates to a process for producing nitrosyl fluoride.

Nitrosyl fluoride (NOF) is a known product used in the art as a chemical nitrosing, fluorinating and oxidising agent. It is particularly useful in the preparation of aryl fluorides in which the nitrosyl fluoride is reacted with a primary aromatic amine to give the corresponding aryl diazonium fluoride, which is decomposed thermally to aryl fluoride. For this known art reference should be made to the description given in JACS (1950), 72, 4809 and U.S. Pat. No. 3,160,623.

Various processes are known in the art for preparing nitrosyl fluoride. Some of these processes use as raw material nitrosyl chloride (NOCl), which is reacted either as such or in complex form with hydrofluoric acid or with an alkaline or silver fluoride. Alternatively, nitrogen oxide (NO) can be reacted with measured quantities of chlorine and hydrofluoric acid. In other known processes the nitrosyl fluoride is obtained by direct reaction of fluorine with nitrogen oxide (NO) operating in the gaseous phase, or by thermal decomposition of trifluoro nitro methane ($CF_3NO_2$) at high temperature. For this process reference should be made to the description given in Angew. Chem., Int. Ed. 7, 440 (1978) and to DE patent 1,123,297.

The aforesaid processes of the known art suffer from various drawbacks. In particular the useful reaction product conversion yields are generally unsatisfactory. In addition the transformations sometimes require drastic reaction conditions bordering on the dangerous. Finally, known processes often use raw materials which are costly or difficult to obtain commercially.

The object of this invention is to overcome said drawbacks by a simple and convenient process which allows nitrosyl fluoride to be prepared with high yield from widely available raw materials. This is attained according to the invention by a process for preparing nitrosyl fluoride, said process being characterised essentially by reacting nitrosyl sulphuric acid with hydrofluoric acid operating in the liquid phase in the presence of water. The reaction can be represented schematically by the following equation.

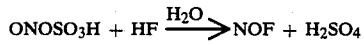

$$ONOSO_3H + HF \xrightarrow{H_2O} NOF + H_2SO_4$$

The nitrosyl sulphuric acid used in the process of the invention can be the pure crystalline product with a melting point of about 73° C. However it is preferable to use technical nitrosyl sulphuric acid which is an oily liquid product consisting of a mixture of nitrosyl sulphuric acid and sulphuric acid containing a sulphuric acid quantity which can exceed 50% by weight in the mixture.

Conveniently, the reaction is conducted with an excess of hydrofluoric acid over the stoichiometric, and in particular with a molar ratio of hydrofluoric acid to nitrosyl sulphuric acid equal to or greater than 6:1. The maximum value of this ratio is not critical and is dictated mainly by economic considerations, taking account of the recovery and recycling of the hydrofluoric acid which remains unaltered in the reaction mixture. Preferably the process is conducted with a molar ratio of hydrofluoric acid to nitrosyl sulphuric acid of the order of 8:1–12:1.

The presence of water in the reaction medium is critical in the process of the present invention. In this respect the reaction does not take place, or only to a small degree, in an anhydrous or substantially anhydrous environment. Consequently, according to the present invention the reaction is conducted in the presence of water in a quantity of at least 2 moles per mole of nitrosyl sulphuric acid. The upper limit of the water concentration in the reaction mixture is not particularly critical and is dictated essentially by the hydrolytic effect of the water on the hydrolysable chemical species present. Generally it is not convenient to exceed a water concentration of 6 moles per mole of nitrosyl sulphuric acid. Best results are obtained with a water quantity of between 3 and 5 moles per mole of nitrosyl sulphuric acid. The water can be added to the reaction mixture in any suitable manner. The water is preferably added together with the hydrofluoric acid as an aqueous solution of said acid.

In the practical implementation of the process of the present invention, the reactants and the water are brought into contact and the process conducted in the liquid phase at a temperature of between 20° C. and 150° C. at atmosphere, greater than atmospheric or less than atmospheric pressure, and in any event under conditions such as to remove the nitrosyl fluoride from the reaction mixture by evaporation. The process is preferably conducted at atmospheric pressure and at a temperature of between 50° and 150° C.

The excess hydrofluoric acid is removed with the nitrosyl fluoride, this acid forming two azeotropic mixtures with the nitrosyl fluoride, the first with about 5 moles and the second with about 3 moles of hydrofluoric acid per mole of nitrosyl fluoride. The two azeotropic mixtures have boiling points of about 68° C. and 94° C. respectively, at atmospheric pressure. The reaction product separated in this manner can be used either directly in certain applications or can be firstly treated to partially or totally remove the hydrofluoric acid from the nitrosyl fluoride, the hydrofluoric acid thus recovered being recycled to the reaction environment.

The residue of said evaporation consists essentially of aqueous sulphuric acid with a concentration depending on the quantity of water introduced into the system, and typically with a concentration of the order of 70% by weight. Such a sulphuric acid can be used for example in attacking phosphorite in the wet process for the manufacture of phosphoric acid.

The process of the present invention can be conducted either batchwise or continuously, and in all cases enables a high reactant conversion yield and useful reaction product selectivity to be obtained with a short reaction time.

This result is totally unexpected in the light of "Fluorine Chemistry", vol. 1, 1950, Academic Press Inc. Publishers, New York, N.Y. which on page 90 describes the reaction between sulphuric acid and nitrosyl fluoride to produce hydrofluoric acid and nitrosyl sulphuric acid and states that the reaction cannot be reversed for preparation purposes.

Further advantages of the process of the present invention are the mild reaction conditions and the use of reactants easily available commercially. Specifically, nitrosyl sulphuric acid is a product used in the manufacture of dyestuffs and intermediates. The experimental examples given hereinafter illustrate the invention but are not to be considered as limitative of its scope.

EXAMPLE 1

548 g of a 70 weight% aqueous solution of hydrofluoric acid are fed into a 1 liter polytetrafluoroethylene reactor provided with a magnetic stirrer, oil-bath heating and a condenser of fluorinated ethylene/propylene copolymer, after which 350 g of nitrosyl sulphuric acid having a 71.5 weight% concentration are added at ambient temperature (20°-25° C.).

The reactor is then immersed in an oil bath at ambient temperature (20°-25° C.) and the bath temperature is then gradually raised to 140° C. while stirring the reaction mass. During this period the products which are evolved as vapour from the reaction mixture are condensed without rectification and are collected in a separator funnel of fluorinated ethylene/propylene copolymer.

On termination of the reaction 448 g of distillate are obtained showing the following composition on analysis:
- nitrosyl fluoride: 20.8% by weight
- hydrofluoric acid: 70.5% by weight
- water: 8.6% by weight.

The residue in the reactor, weighing 431 g, contains:
- sulphuric acid: 68.8% by weight
- nitrosyl sulphuric acid: 0.9% by weight
- hydrofluoric acid: 2.0% by weight
- water: 28.3% by weight.

The nitrosyl fluoride yield is therefore 96.56% with respect to the nitrosyl sulphuric acid initially fed into the reactor.

EXAMPLE 2

The procedure of Example 1 is repeated feeding into the reactor 102 g of hydrofluoric acid, 45 g of water and 100 g of nitrosyl sulphuric acid with a concentration of 65% by weight. The bath temperature is gradually raised from ambient to a final temperature of 145° C.

104 g of distillate are obtained containing 21.3 weight% of nitrosyl fluoride and 132 g of a residue containing 67.1 weight% of sulphuric acid.

The nitrosyl fluoride yield is therefore 88% with respect to the nitrosyl sulphuric acid initially fed into the reactor.

EXAMPLE 3

The procedure of Example 1 is repeated feeding into the reactor 265 g of hydrofluoric acid, 125 g of water and 294 g of nitrosyl sulphuric acid with a concentration of 71% by weight. The bath temperature is gradually raised from ambient to a final temperature of 150° C.

303 g of distillate are obtained with the following composition:
- nitrosyl fluoride: 25.3% by weight
- hydrofluoric acid: 66.3% by weight
- water: 8.4% by weight.

The residue in the reactor, weighing 344 g, contains:
- sulphuric acid: 68.4% by weight
- nitrosyl sulphuric acid: 0.7% by weight
- hydrofluoric acid: 2.2% by weight
- water: 28.7% by weight.

The nitrosyl fluoride yield is therefore 95.18% with respect to the nitrosyl sulphuric acid initially fed into the reactor.

EXAMPLE 4 (comparison)

The procedure of Example 1 is repeated feeding into the reactor 100 g of nitrosyl sulphuric acid with a concentration of 72 weight% and 100 g of anhydrous hydrofluoric acid. The bath temperature is raised to 135° C. over a period of two hours. 78 g of distillate are collected comprising only hydrofluoric acid.

We claim:

1. A process for preparing nitrosyl fluoride, comprising reacting nitrosyl sulfuric acid with hydrofluoric acid in the liquid phase in the present of water in an amount of at least 2 moles of water per mole of nitrosyl sulfuric acid.

2. The process as claimed in claim 1, wherein the nitrosyl sulfuric acid is technical nitrosyl sulfuric acid consisting essentially of a mixture of nitrosyl sulfuric acid and sulfuric acid.

3. The process as claimed in claim 1, further comprising conducting the reaction with a molar ratio of hydrofluoric acid to nitrosyl sulfuric acid of at least 6:1.

4. The process as claimed in claim 3, wherein said molar ratio of hyrdrofluoric acid to nitrosyl sulfuric acid is within the range of 8:1 to 12:1.

5. The process as claimed in claim 1, wherein the amount of water is between 2 and 6 moles per mole of nitrosyl sulfuric acid.

6. The process as claimed in claim 5, wherein the amount of water is from 3 to 5 moles per mole of nitrosyl sulfuric acid.

7. The process as claimed in claim 1, comprising conducting the reaction at a temperature of between 20° and 150° C.

8. The process as claimed in claim 7, wherein the reaction temperature is from 50° to 150° C.

9. The process as claimed in claim 1, further comprising removing the nitrosyl fluoride from the reaction mixture together with the excess hydrofluoric acid by evaporation.

* * * * *